Patented Feb. 26, 1946

2,395,412

UNITED STATES PATENT OFFICE 2,395,412

SULPHANILAMIDE DERIVATIVES

Charles Edward Kwartler and Philip Lucas, Albany, N. Y., assignors to Winthrop Chemical Company, Inc., New York, N. Y., a corporation of New York No Drawing. Application March 4, 1943, Serial No. 478,000

5 Claims. (Cl. 260—397.7)

This invention relates to a process for preparing sulphanilamide derivatives and more particularly sulphanilylamidines.

In the past sulphanilylamidines have been prepared by the reduction of p-nitrobenzenesulphonylamidines, but this procedure has the disadvantage of requiring the use of the comparatively expensive p-nitrobenzenesulphonyl chloride.

It has now been found that sulphanilylamidines may be prepared easily and cheaply by reacting a p-acylaminobenzenesulphonyl halide with an amidine and hydrolyzing the resulting p-acylaminobenzenesulphonylamidine with alcoholic mineral acid to deacylate it.

The first step in this procedure, namely, the preparation of the p-acylaminobenzenesulphonylamidine (also called $N^4$-acylsulphanilylamidine) is conveniently carried out by reacting the sulphonyl chloride or sulphonyl bromide with the appropriate amidine in a diluent and preferably also in the presence of an acid-binding agent. Thus the condensation can be effected in pyridine, in acetone, or in water kept alkaline by the presence of a sufficient amount of sodium hydroxide or sodium carbonate. As sulphonyl halides there may be used any p-acylaminobenzenesulphonyl halide although in practice p-acetylaminobenzenesulphonyl chloride is preferred because of its cheapness and availability. However, p-propionyl-aminobenzenesulphonyl chloride, p-benzoyl-aminobenzenesulphonyl chloride, p-acetylaminobenzenesulphonyl bromide and similar compounds can also be used.

The amidine employed in the condensation can be a simple lower aliphatic amidine such as acetamidine or butyramidine or it may be an aromatic amidine such as benzamidine or p-anisamidine. Again other amidines can be used such as dodecaneamidine, phenylacetamidine, furamidine, etc. Also guanidines (which are amino-amidines) may be used as the amidine component. In any case the amidine component may be used as such, that is, as the free base, but it is generally more convenient to use it in the form of a salt together with a sufficient amount of a strong alkali to liberate the free amidine. Such amidine salts include the nitrate, the sulphate, the carbonate, the hydrochloride, etc.

The resulting $N^4$-acylsulphanilylamidine is hydrolyzed (deacylated) to the corresponding sulphanilylamidine by treatment with an alcoholic solution of a mineral acid. It has been found that the conditions for the hydrolysis are rather critical in that if hydrolysis is permitted to go beyond the desired point, the amidine is further attacked with formation of sulphanilamide or other undesired products. On the other hand, if the hydrolysis is not sufficiently complete, the yields obviously are low. It has been found that the best conditions for the hydrolysis consist in shaking or otherwise mixing the $N^4$-acylsulphanilylamidine for about 12–36 hours at room temperature with a 15–25% solution of hydrogen chloride in ethyl alcohol.

Instead of using hydrogen chloride as the mineral acid, hydrogen bromide or sulphuric acid may be employed and, likewise, methanol, isopropanol or n-butanol may be used in place of the ethyl alcohol. If the hydrolysis is conducted at temperatures higher than room temperature, the reaction time must correspondingly be considerably reduced.

The invention is illustrated by the following examples:

EXAMPLE 1

A. $N^4$-acetylsulphanilylamidine.—A solution of 35 gm. (0.15 mole) of p-acetylaminobenzenesulphonyl chloride in 100 cc. of acetone is added dropwise to a mechanically stirred solution at 0–5° C. of 9.45 gm. (0.1 mole) of acetamidine hydrochloride in 40 cc. of water, the reaction mixture being kept neutral or slightly alkaline by frequent addition of dilute sodium hydroxide solution. After the mixture has stirred at room temperature over-night, it is made neutral and the precipitate collected and recrystallized from water-acetic acid. Thus there is obtained 13 gm. (51% yield) of p-acetylaminobenzenesulphonylacetamidine, M. P. 241–243° C.

B. Sulphanilylacetamidine.—A suspension of 47 gm. of the above p-acetylaminobenzenesulphonylacetamidine in a mixture of 500 cc. of 20% ethyl alcoholic hydrogen chloride and 4 cc. of concentrated hydrochloric acid is shaken at room temperature for 36 hours. The sulphanilylacetamidine hydrochloride which precipitates is collected by filtration and melts at 191–195° C. with decomposition. To obtain the free sulphanilylacetamidine the hydrochloride is dissolved in water and the aqueous solution neutralized with sodium hydroxide in the cold. The precipitate is collected and recrystallized from hot water. The yield of pure sulphanilylacetamidine, M. P. 150–152° C., is 23 gm. (58% of theory).

C. Using the procedure outlined in Part A but employing equivalent amounts of propionamidine, butyramidine, tridecanamidine, benzamidine, or phenylacetamidine as the amidine component, the following $N^4$-acetylsulphanilylamidines can be prepared:

Table I

|  | Melting point |
|---|---|
|  | °C. |
| $N^4$-acetylsulphanilylpropionamidine | 192-195 |
| $N^4$-acetylsulphanilylbutyramidine | 149-151 |
| $N^4$-acetylsulphanilyltridecanamidine | 114-116 |
| $N^4$-acetylsulphanilylbenzamidine | 211-212 |
| $N^4$-acetsulphanilylphenylacetamidine | 193-195 |

The tridecanamidine employed above has not hitherto been described. It is prepared according to the usual amidine synthesis, as follows: A cold mixture of 78 gm. of tridecano-nitrile and 18.5 gm. of absolute alcohol in 150 cc. of dry ether is saturated with dry hydrogen chloride. After the mixture has stood for 9 days at 5° C. the crystalline tridecanimino ethyl ester hydrochloride is collected. It melts at 99-102° C. This is converted into tridecanamidine hydrochloride by allowing the nitrile (50 gm.) to stand in 200 cc. of 9.5% alcoholic ammonia at room temperature for 20 hours. On concentrating the solution and adding ether the tridecanamidine hydrochloride deposits and may be collected. It melts at 135°-136° C.

D. The $N^4$-acetylsulphanilylamidines listed in Table I above can be converted into the corresponding sulphanilylamidines by deacetylation according to the procedure given in Part B above. The properties of the resulting sulphanilylamidines are listed below:

Table II

|  | Melting point |
|---|---|
|  | °C. |
| Sulphanilylpropionamidine | 145-146 |
| Sulphanilylbutyramidine | 79-82 |
| Sulphanilyltridecanamidine | 93-94 |
| Sulphanilylbenzamidine | 207-209 |
| Sulphanilylphenylacetamidine | 169-172 |

EXAMPLE 2

*Sulphanilylguanidine.*—A suspension of 10 gm. of $N^4$-acetylsulphanilylguanidine in 60 cc. of 25% alcoholic hydrogen chloride is shaken at room temperature for 15 hours. Then the solid is collected. An additional amount of the solid is obtained by concentrating the alcoholic mother liquor and adding ether. The combined crops of solid are dissolved in water and carefully neutralized with dilute sodium hydroxide. The precipitated solid is collected and recrystallized from water to yield sulphanilylguandine (5.6 gm. or 64% yield).

We claim:
1. In a process for preparing a sulphanilylamidine the step which comprises deacylating a p-acylaminobenzenesulphonylamidine with alcoholic mineral acid.
2. In a process for preparing sulphanilylacetamidine the step which comprises deacetylating p-acetylaminobenzenesulphonylacetamidine by treating it with a 15-25% solution of hydrogen chloride in ethyl alcohol for about 12-36 hours at about room temperature.
3. In a process for preparing sulphanilylbenzamidine the step which comprises deacetylating p-acetylaminobenzenesulphonylbenzamidine by treating it with a 15-25% solution of hydrogen chloride in ethyl alcohol for about 12-36 hours at about room temperature.
4. In a process for preparing sulphanilylguanidine the step which comprises deacetylating p-acetylaminobenzenesulphonylguanidine by treating it with a 15-25% solution of hydrogen chloride in ethyl alcohol for about 12-36 hours at about room temperature.
5. In a process for preparing a sulphanilylamidine the step which comprises deacylating a p-acylaminobenzenesulphonylamidine by treating it with a 15-25% solution of hydrogen chloride in ethyl alcohol for about 12-36 hours at about room temperature.

CHARLES E. KWARTLER.
PHILIP LUCAS.